(12) United States Patent
Hanson et al.

(10) Patent No.: US 6,971,048 B1
(45) Date of Patent: Nov. 29, 2005

(54) TESTING DEVICE DRIVER HARDENING

(75) Inventors: Stephen Richard Hanson, Aldworth (GB); Edward James Radley, Fleet (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1133 days.

(21) Appl. No.: 09/097,468

(22) Filed: Jun. 15, 1998

(51) Int. Cl.[7] .............................................. G06F 11/00
(52) U.S. Cl. ........................................ 714/41; 714/25
(58) Field of Search ............................ 714/28, 32, 38, 714/25, 33, 47, 41, 30, 727, 733, 734

(56) References Cited

U.S. PATENT DOCUMENTS

| | | | | |
|---|---|---|---|---|
| 4,312,066 A | * | 1/1982 | Bantz et al. ................. | 714/710 |
| 5,001,712 A | * | 3/1991 | Splett et al. ................. | 714/41 |
| 5,193,178 A | * | 3/1993 | Chillarege et al. ............ | 714/25 |
| 5,627,965 A | | 5/1997 | Liddell et al. | |
| 5,864,653 A | * | 1/1999 | Tavallaei et al. ............. | 714/1 |

FOREIGN PATENT DOCUMENTS

| | | |
|---|---|---|
| EP | 0 558 865 | 9/1993 |

OTHER PUBLICATIONS

Microsoft Press Computer Dictionary 118 (2d ed. 1994).*
"Dart—An Automated Diagnostic Analysis Routine Tester," IBM Technical Disclosure Bulletin, vol. 34, No. 10B, Mar. 1992, pp. 31-34.
"ELO Alignment Marks for Dual Subcollector Processes," IBM Technical Disclosure Bulletin, vol. 34, No. 6B, Nov. 1989, p. 356.
International Search Report, Application No. PCT/US99/13069, mailed Oct. 15, 1999.

* cited by examiner

*Primary Examiner*—Pierre E. Elisca
(74) *Attorney, Agent, or Firm*—Meyertons Hood Kivlin Kowert & Goetzel, P.C.; B. Noël Kivlin

(57) ABSTRACT

A test mechanism for testing device driver hardening includes an intercept mechanism for intercepting device driver access calls from a device driver under test and an interface for configuring the intercept mechanism to inject faults according to a determined test pattern. This mechanism enables the arbitrary introduction of typical faults. These faults may be introduced totally asynchronously and so emulate real life. A test harness module can be linked in to a test build of the driver. The test harness can intercept all of the device access calls. It mimics the normal function of these calls accessing the offset address and propagating the appropriate data. A test application is able to interpret a test script and to compare device driver responses to injected faults.

26 Claims, 7 Drawing Sheets

TESTING DEVICE DRIVER HARDENING

BACKGROUND OF THE INVENTION

This invention relates to the testing of device drivers, and in particular to testing the hardening of device drivers.

Traditionally devices drivers have been written with their emphasis on good performance and correct operation in the absence of faults. Looking in driver writing guides and training material there is little (if any) mention made of how to deal with faulty hardware devices. A faulty device can and often will cause the system to crash. As a result, a $50 PCI card can crash a $500,000 server.

A standard approach to improving system availability in the face of I/O faults is to have the system crash, then reboot and configure the faulty device out of the system. This is not always, however, an acceptable approach.

A much better approach is to modify drivers to survive I/O faults and reconfigure the device without a reboot. A device driver which has been designed to be resilient against such failures is known as a "hardened" driver. A hardened device driver is defined as being a device driver with the minimal potential of compromising the integrity of the system of which it is part.

Driver hardening techniques have the potential to contribute greatly to system Reliability, Availability & Serviceability (RAS). Hardened device drivers reduce the potential for defective devices to cause a totally disruptive system loss. The failed component can then be replaced as part of scheduled maintenance. To so harden a device driver a designer has to consider the many implications that the failing hardware may have on their code.

The philosophy behind successful driver hardening is one of total paranoia. A defective device can be thought of as containing a 'malicious saboteur' whose ambition is to completely disrupt the server system of which it is part. It may attempt this in a range of devious and inventive ways. It may refuse to respond to accesses, so causing bus time-out exceptions. It may seek to totally absorb a processor in servicing hoax interrupts. It may attempt to dupe the system kernel into undertaking suicidal action. It may simply go quiet and withhold vital services. It may corrupt the data which it delivers.

The hardened driver must have the ability to rapidly identify & contain a fault. Timely detection is necessary if the implications of a device failure are to be controlled. Preservation of system integrity requires that faults are detected before they uncontrollably alter the system state. Consequently steps must be taken to test for faults whenever data returned from the device is going to be 'used' by the system.

As with any other aspect of a computer system, it is desirable to be able to test a device driver, and in particular the hardening of a device driver, to deal with faults the device driver will need to contend with in a computer system. The hardening of the device drivers can be tested to some extent by physically modifying the system and device hardware to allow the introduction of the faults it is desired to test. However, this is an expensive and time consuming task, and may in the end only give limited ability to test possible faults.

Accordingly, an aim of the present invention is to provide a more effective testing that device drivers have been correctly and thoroughly hardened.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention there is provided a test mechanism for testing device driver hardening. The test mechanism comprises an intercept mechanism for intercepting device access calls from a device driver under test and an interface for configuring the intercept mechanism for faults to be injected in response to the device access calls according to a determined test pattern.

Accordingly an embodiment of the invention provides a hardened driver test mechanism. This test mechanism provides a harness enabling the arbitrary introduction of typical faults. These faults may be introduced totally asynchronously and to emulate real life.

The intercept mechanism can comprise a test module which can be loaded into the operating system. Once loaded the test module can intercept all of the device access calls. It mimics the normal functions of these calls accessing the offset address and propagating the appropriate data. This test module can comprise a test driver and a plurality of intercept routines. The interface can be in the form of a programming interface (API) which allows user test applications to supply information to the driver for configuring the intercept routines to provide specific corruption of data obtained through device accesses.

The device access calls are redirected/mapped to the intercept routines by a device access infrastructure. This redirecting/mapping could be achieved using a lookup table. Alternatively other redirecting/mapping mechanisms could be used.

The device access infrastructure of a device driver interface mechanism can be responsive to a device driver interface access request to intercept the request for the selective insertion of errors, whereby the subsequent device driver access call causes device access with the performing of an additional pre-specified logical/arithmetical operation on the data so obtained or does not cause device access, but instead the return of an emulated device response.

An embodiment of the invention overcomes the problem that it is not normally possible to have sufficient access to the hardware design of a device to be able to inject a suitable varied range of faults. Modern device drivers access hardware through a set of specific functions. The use of these functions within a compliant driver can facilitate the construction of a hardened driver test mechanism.

The present test mechanism allows a test engineer to specify a reference to (for example) a specific device, a specific register set on that device, an offset range, a data mask value, a logical/arithmetic operator (=, NOT, AND, OR, XOR, +, −) and an access count. Intercept routines then check each use by the device driver interface of the device access calls to see if it is within the specified parameters. A count is decremented on each matching occurrence. When the count has expired the data read can be operated upon by a pre-specified operator and operand. This allows a test mechanism to introduce a vast range of different faults.

In accordance with another aspect of the invention, there is provided a computer program product on a carrier medium, the computer program product comprising a test mechanism as described above.

In accordance with a further aspect of the invention, there is provided a test application on a carrier medium for a test mechanism as described above. The test application comprises computer code configured to be operable to provide the test mechanism with a test configuration, to detect the response of a driver to a test condition inserted by the test mechanism, to compare the detected response to an expected response set out in a test script and to identify discrepancies between the detected response and the expected response. The test application can also be operable to maintain a log of the detected responses.

In accordance with a further aspect of the invention, there is provided a computer comprising a processor, memory, an I/O bus controller, at least one I/O device, a device driver for accessing the I/O device, and a test mechanism as described above.

In accordance with a further aspect of the invention, there is provided a method of testing the hardening of a device driver, the method comprising intercepting device access calls initiated from the device driver and redirecting them via a test module comprising at least one intercept routine for injecting a fault in a response to the device access function call according to a desired test pattern.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

An embodiment of the present invention will be described in the context of a Peripheral Component Interconnect (PCI) local bus. It should be noted that the application of an embodiment of the invention is not limited to a PCI local bus architecture, but could be used with other bus architectures.

Figure 1:
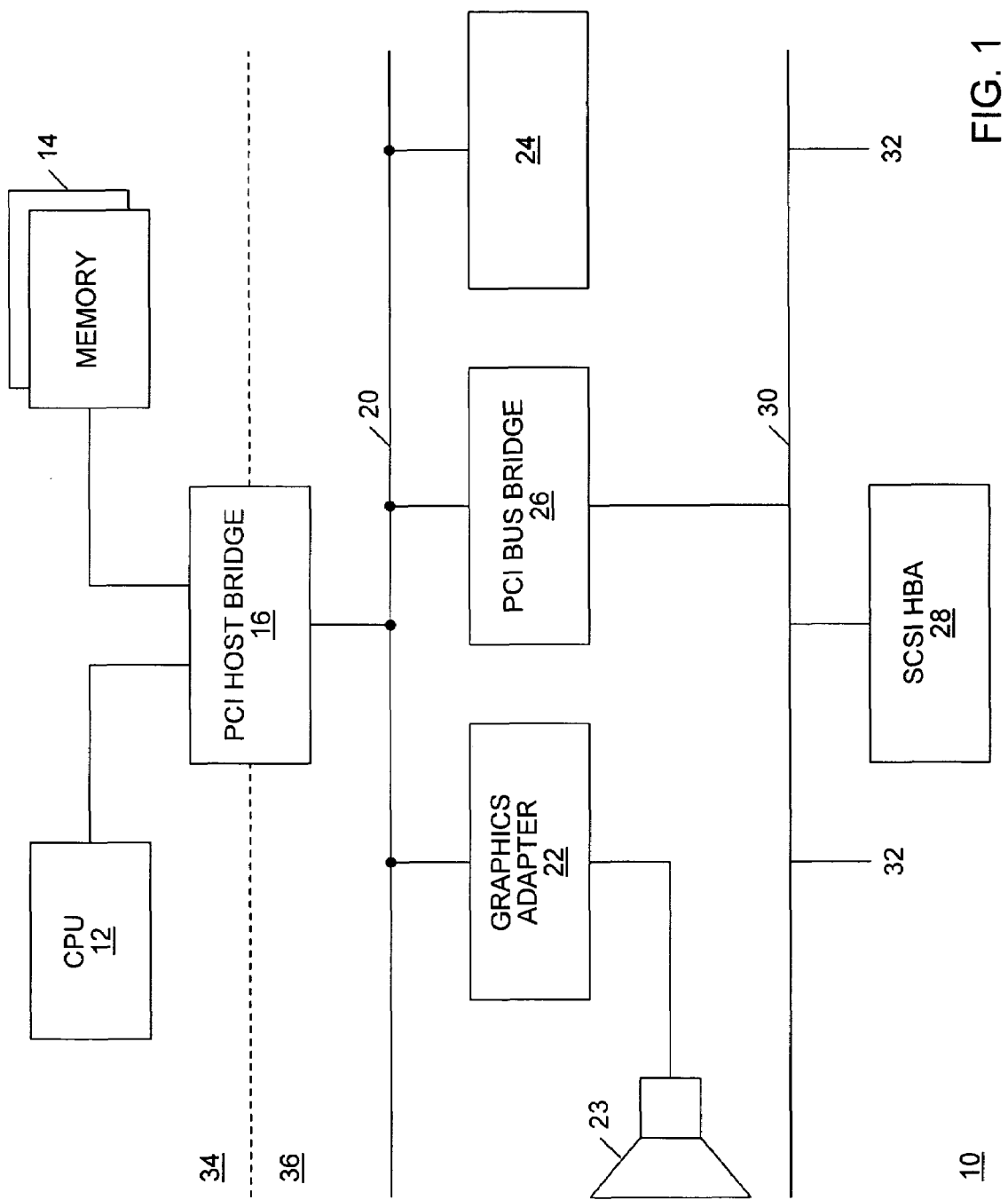
FIG. 1 is a schematic block diagram of a bus structure for a processing system.

FIG. 1 is a schematic overview of a computer system including a PCI local bus system. A PCI bus usually resides on the system board of a computer system. As shown in FIG. 1, a processor 12, main memory 14 and a PCI bus 20 are connected through a PCI host bridge 16. Through a cascade of PCI bus bridges (of which only one PCI bus bridge 26 is shown), a tree structure of interconnected I/O buses is supported. In other words, subordinate PCI bus bridges can be extended underneath the PCI host bridge 16 to allow a single bus system to be expanded into a complex system with multiple secondary buses, such as the secondary bus 30. PCI devices can be connected to one of these secondary buses 30 (e.g., a Small Computer System Interface (SCSI) 28) as well as to the main PCI bus (e.g., a graphics adapter 22 and a local area network (LAN) adapter 24). As well as the features mentioned above, the computer system can comprise other typical elements of a computer system, including a display 23 and data entry devices, such as keyboards, etc., (not shown).

Each PCI device has a unique vendor identifier (vendor ID) and a device ID. Multiple devices of the same kind are further identified by a unique device number on the bus where they reside. Typical PCI devices include SCSI adapters, graphics and/or display adapters, network controllers, etc. (e.g., the graphics adapter 22, local area network (LAN) adapter 24 and SCSI adapter 28 shown in FIG. 1).

The PCI host bridge 16 provides an interconnection between the processor 12 and the peripheral components such as devices 22, 24, 28. Through the PCI host bridge 16, the processor can directly access the main memory 14 independently of other PCI bus masters. The PCI host bridge 16 also provides data access mappings between the processor 12 and the peripheral I/O devices, such as the devices 22, 24 and 28. It maps every peripheral device to the host address domain so that the processor can access the device through memory mapped I/O or special I/O instructions. The PCI host bridge 16 can map the system memory 14 within a host address domain 34 to a PCI address domain 36 so that a PCI device, such as the devices 22, 24, 26 and 28 can access the main memory 14 as a bus master.

Configuration address space within the PCI domain is defined graphically. In other words, the location of a peripheral device is determined by its physical location with an interconnect tree of PCI bus bridges. A device is usually located by its bus number and a device (slot) number. Each peripheral device contains a set of well defined configuration registers in its PCI configuration space. The registers are used not only to identify devices, but also to divide device configuration through system software. For example, base address registers in the device configuration space must be allocated before a device can respond to a data access.

Figure 2:
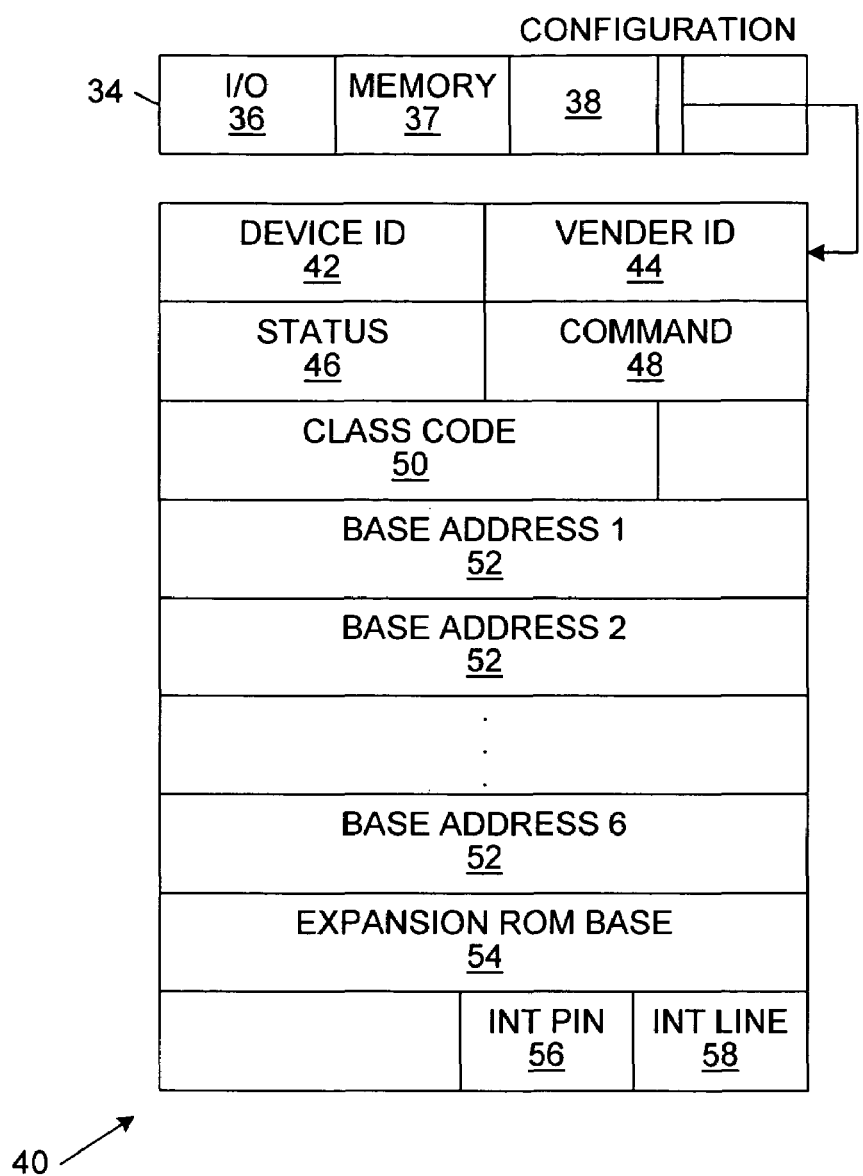
FIG. 2 illustrates a configuration file for the system of FIG. 1.

An example of a format for the configuration registers is illustrated in FIG. 2. The address space 34 is divided between I/O addresses 36, memory addresses 37 and configuration addresses 38, whereby a specific example of a configuration space register 40 is represented in more detail. As shown in FIG. 2, the configuration registers contain a device ID 42, a vendor ID 44, status and command information 46 and 48, a class code 50, a set of base addresses 52, expansion ROM base information 54, and interrupt pin identifier 56 and an interrupt line identifier 58.

The actual method for generating configuration cycles is host dependent. In x86 type processors, special I/O ports are used. In other instruction set architectures, the PCI configuration space may be memory-mapped to certain address locations corresponding to the PCI host bridge 16 in the host address domain 34. When the device configuration register 40 is accessed by the processor 12, the request is then routed to the PCI host bridge 16. The PCI host bridge 16 then translates the access into appropriate configuration cycles on the bus 20.

Processors with special I/O instructions, such as the x86 processor family, access the I/O with "in" and "out" instructions. Machines with no special I/O instructions are usually memory-mapped to the address locations corresponding to the PCI host bridge in the host address domain. When the processor 12 accesses the memory-mapped addresses, and I/O request will be sent to the PCI host bridge. It then translates the addresses into I/O cycles and puts them onto the PCI bus 20. Memory-mapped I/O is performed by the native load/store instructions of the processor. For example, reading from or writing to a memory-mapped data register can be done by a load or store instruction to that register's I/O address.

I/O device components can be represented by an independent device information paradigm. A "name, value" pair notation called a property is used. For example, a "reg" property is used to represent device registers and on board memory.

Figure 3:
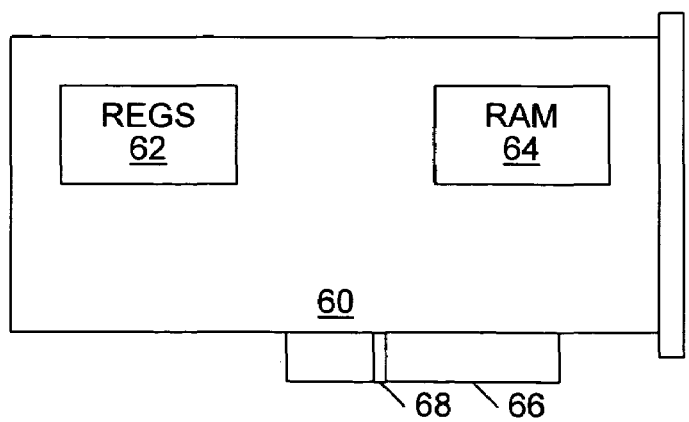
FIG. 3 is a schematic representation of an I/O card.

FIG. 3 is a schematic representation of a PCI I/O device card 60 having registers (regs) 62 and memory (RAM) 64. Other components will of course be provided on the device card, depending on the nature of that card, but are not shown in FIG. 3 for conciseness of explanation. The card connector 66 is provided with an interrupt pin 68. Accordingly, the "reg" property value encodes the device register, address and size. Thus, for example, reg=DD,addr1,size1 can represent the address and size of the registers 62 and reg=DD,addr2,size2 can represent the address and size of the memory 64 in the I/O device. An "interrupt" property can be used to represent the device interrupt pin 68 (e.g., interrupts=a).

PCI bus binding augments the standard device information paradigm for the PCI local bus. PCI properties are defined according to the PCI local bus specification. For example, the "reg" property includes a sequence of physical address, size pairs. The value of each pair consists of five cells and represents an address location and size within the PCI address domain. The various properties in the address configuration registers are established in accordance with standard PCI techniques, as will be understood by one skilled in the art.

There are many detailed differences between different systems for PCI implementations. Accordingly, a flexible structure for defining device drivers which can be portable to different environments, is required.

Figure 4:
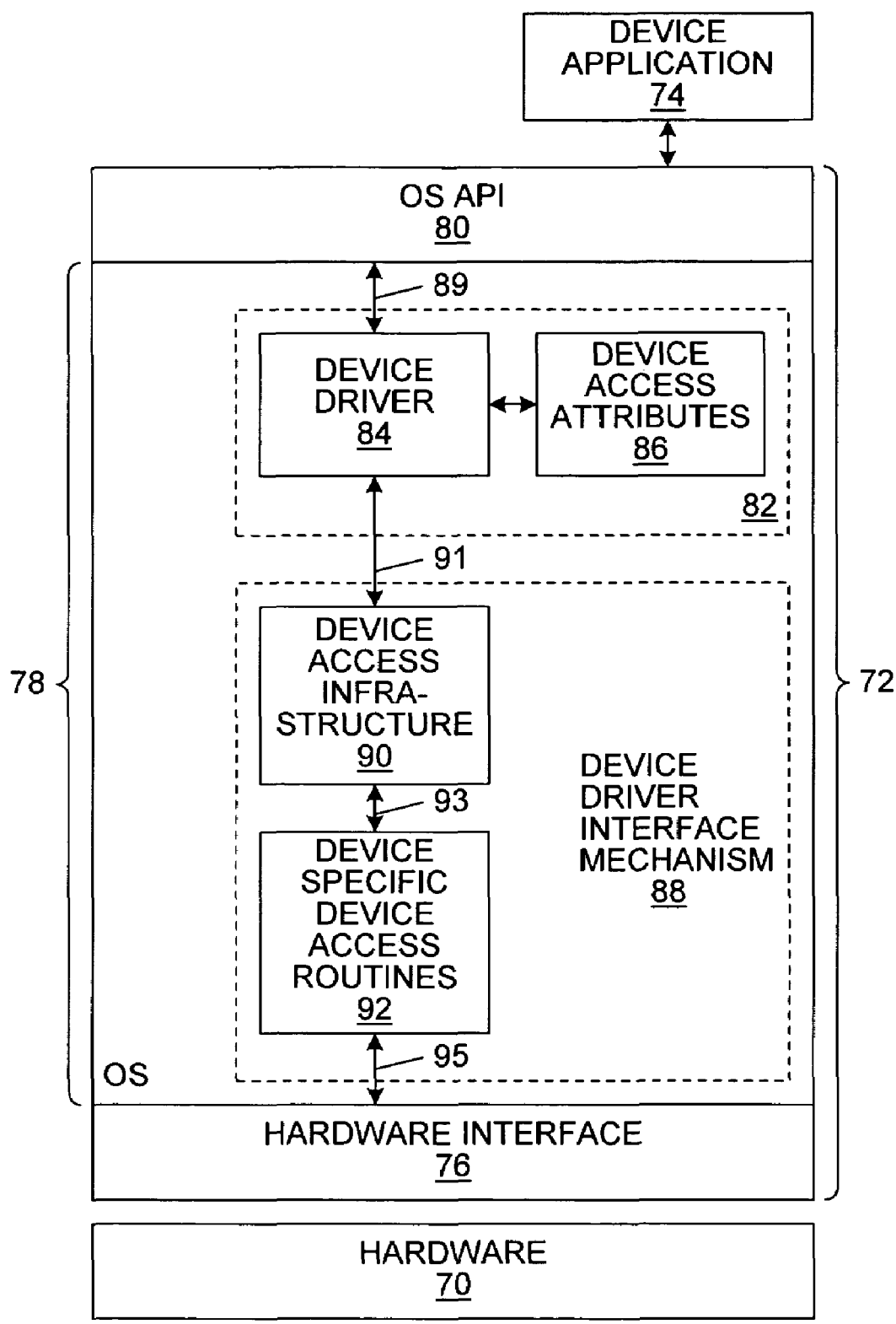
FIG. 4 is a schematic representation of software and hardware elements of the system of a processor of FIG. 1.

FIG. 4 is a schematic overview of a device driver implementation providing flexibility. FIG. 4 represents the interface between processor hardware 70, the operating system 72 and an application 74. A hardware interface 76 provides low-level load/store functions at the interface between the operating system 72 and the hardware 70. An applications programmer interface (API) 80 provides a high level interface to application programs. Located logically between the hardware interface 76 and the API 80 is found the main body 78 of the operating system components. Included at the level of the main body of operation system components is a device driver domain 82 which includes one or more device drivers 84. Between the device drivers and the hardware interface a device driver interface mechanism 88 is provided which includes a device access infrastructure 90 and bus specific device access routines 92, which enable the portable (bus independent) device drivers 84 to access the devices concerned.

A device driver 84 defines the characteristics and access attributes of a data object through a data structure called the device access attributes 86. The data objects may be device objects such as device register/memory, or a DMA-able memory object such as an Ethernet ring buffer or a SCSI adapter command control block. The device access attributes are separated into byte ordering flags and data ordering attributes. The device driver 84 specifies the byte ordering format of its device data structure using the flags of the device access attributes 86 and specifies data ordering characteristics in accordance with the data ordering attributes. The device driver 84 is operable to compose a device driver interface access request 91 to the device driver interface mechanism.

The device driver interface mechanism 88 includes a device access infrastructure 90 which is responsive to the device driver 84 and also bus-specific device access routines 92, for defining device access within the operating environment of the computer system concerned. The device access infrastructure 90 is operable to respond to device access requests 91 supplied to the device driver interface mechanism 88 to make a device access call 93 to one or more appropriate bus-specific device access routines 92 for handling the device access operation. This can be achieved by the device access infrastructure 90 including a table responsive to a device access request 91, to identify the appropriate bus-specific device access routine(s) 92 for handling the request 91. The bus-specific device access routines 92 define the functionality for interfacing a portable device driver 84 and the computer system hardware. Accordingly, the device drivers do not need knowledge of hardware factors such as Endianness (byte swapping), data ordering, device access space, direct memory access (DMA) allocation and property data types.

An embodiment of the invention employs the device driver interface mechanism 88 to intercept device access calls 93 to the bus-specific device access routines 92 in order to simulate faulting hardware. Communications between the device access infrastructure 90 and the device access routines can thereby be diverted via a test harness in the form of a test module for faults can be injected at this level. This has the advantage of being more readily accessible than hardware techniques. The modified device access mechanism allows deterministic fault injection so making testing repeatable.

The test mechanism of an embodiment of the invention can be used to inject a variety of "random" faults, so that an independent system test group can carry out a confidence test that the driver is hardened. These faults may be introduced totally asynchronously and so emulate real life. A suitably wide range of different types of "typical" hardware faults can be injected in a controlled and repeatable fashion, which is typically not possible by modifying the device hardware.

An embodiment of a test mechanism, which could also be described as a fault injection test harness, in accordance with the invention works by intercepting device access operations at the device access infrastructure 90, and then corrupts the result of the bus-specific device access routine calls as if the hardware had caused the corruption. The test mechanism can also be arranged to detect if routine accesses are performed which do not pass via the access controller, (i.e. memory mapped external access through direct pointer reference—a practice now deprecated).

Figure 5:
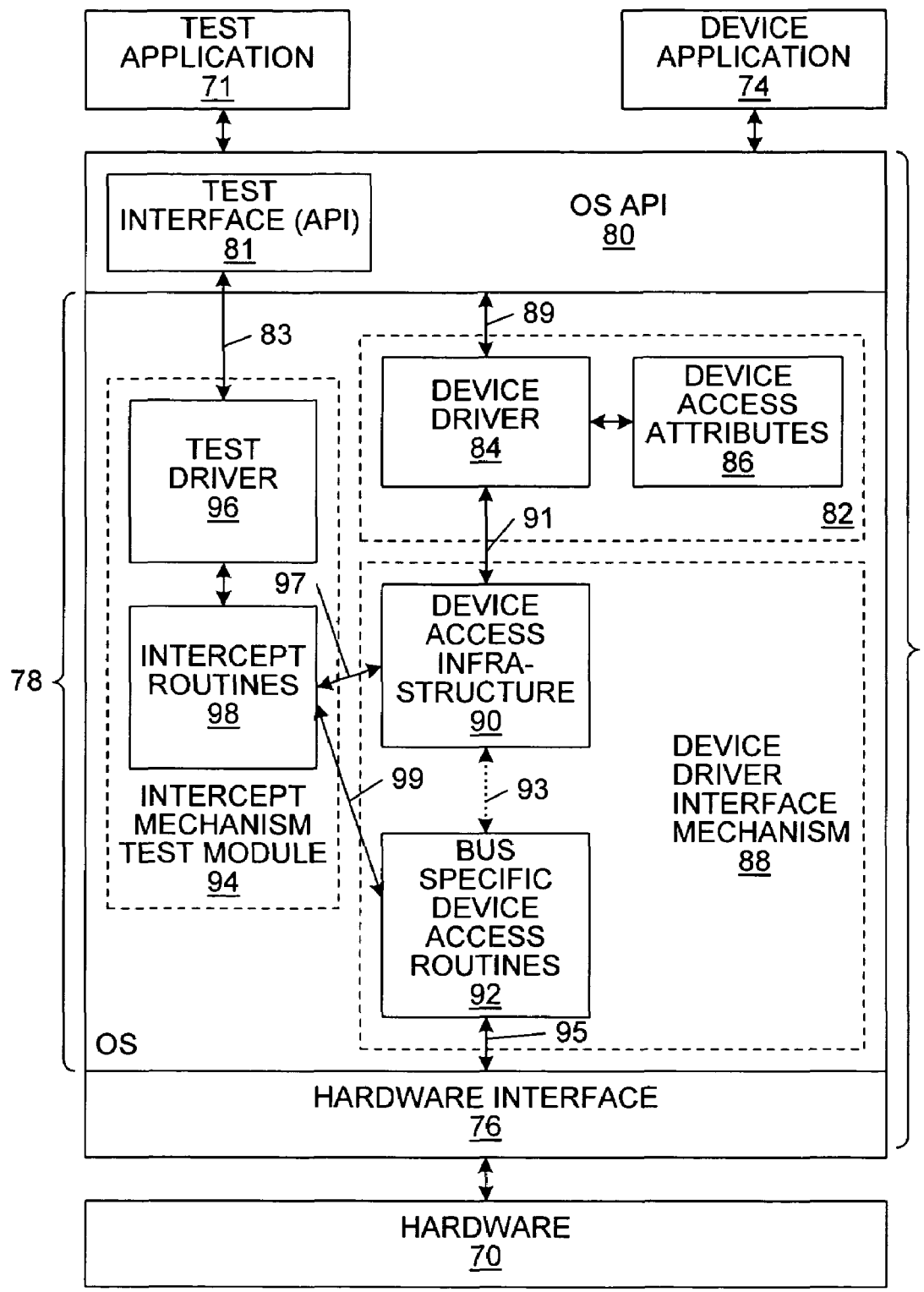
FIG. 5 is a schematic block diagram of part of a device driver test mechanism according to an embodiment of the invention.

Accordingly, FIG. 5 is a schematic overview of an extension of a structure of FIG. 4 to provide a test mechanism in accordance with an embodiment of the present invention. In the structure of FIG. 5, in addition to the elements already shown in FIG. 4, which is repeated in FIG. 5, a test module 94 is provided including a test driver 96 and a set of intercept routines 98. The test module cooperates with the device access infrastructure 90 to form an intercept mechanism for intercepting bus-specific device access function calls. The device access infrastructure 90 of FIG. 5 is operable to cooperate with the test module for intercepting specified device access calls to inject appropriate responses.

Thus, the device access infrastructure 90 at the device driver interface level can be responsive to a device access call (93) to intercept the call for the selective insertion of faults, whereby the device access call does not pass directly to the device access routines 92 (as represented by the dotted line 93), but instead passes via the intercept routines 98 (as represented by the solid lines 97 and/or 99). The device access call may then not result in a device access but may instead result in the return of an emulated device response by virtue of the test harness 94 via the path 97. Alternatively, the device access call may indeed result in a device access with an additional pre-specified logical and/or arithmetic operation with fault data prior to being passed to the devices via the paths 99 and 95.

A user test application 71 can interact with the test driver 96 to configure the intercept routines 98 for specified, or determined corruption of data obtained through the device driver interface access functions. Thus, the writer of a hardened device driver 84 can produce a set of test scripts which use the test mechanism to demonstrate the resilience of the driver. These scripts can use knowledge of the internals of the driver 84 to generate those types of faults which are most likely to cause problems (e.g. register accesses returning values outside the expected range). The test mechanism allows accesses to specific registers to be subject to corruption as well as allowing more random types of corruption to be defined. The test scripts can be re-run at a later date when new versions of the driver or the platform become available. The test mechanism can be considered to be formed by the combination of the test interface 81 and the intercept mechanism, the latter being formed by the test module 94, which cooperates with the device driver interface mechanism 88.

For example, a test engineer is, by means of the test mechanism, able to specify to the system a reference to the device to be tested, the register set on that device, an offset range, a data mask value, a logical operator (=, AND, OR, etc.) and an access count. The intercept routines then check each use by the device driver 84 of the device access calls to the device access routines to see if this is within specified parameters. A count (COUNT 1—FIG. 6) is decremented on each occurrence of a specified device access call. When the count has expired the data read can be operated upon by an operator and operand. This allows a test mechanism to introduce a vast range of different faults.

The test driver 96 supports a number of I/O control operations ("ioctls") 83, from the test interface 81 which allow error definitions ("errdefs") to be defined and subsequently managed. The test driver is a clone driver, so each time it is opened a separate invocation will be created. Any error definitions created by using I/O control instructions to a given invocation will automatically be deleted when the invocation is closed. The test driver 96 is operable to receive a test configuration from a user test application 71 by means of ioctls 95 supplied via an interface in the form of a test interface API 81. The test configuration specifies a reference to the device to be tested, the register set on that device, an offset range, an operand, an operator (=, AND, OR, etc.), an offset access count, an access type (R (read), W (write) or read or write (RW)) and a count of the number of times the fault is to be injected. This defines the parameters for the test.

The device access infrastructure 90 is operable to respond to device access operations to cause the re-routing of the request via the appropriate intercept routines 98 of which there is one for each type of bus access operation. This can be achieved by modifying a table mechanism in the device access infrastructure 90, which would normally be responsive to a bus access operation to identify one or more of the bus specific device access routine(s) 92. However, when in the test mode, the table mechanism is modified to identify intercept routines. In one embodiment of the invention, the intercept routines 98 are managed via the test driver 96.

A user test application 71 which passes the test configuration mentioned above to the test harness driver 96 can be provided with a testing utility configured to interpret a test script and to detect the response of a driver to the test conditions (faults) inserted by the test module 94. The response can be compared to an expected response set out in the test script. Discrepancies can then be flagged. The testing utility can maintain a log of the resulting system messages from the driver under test, annotated with the test configuration active at that time. The testing utility should be able to re-enable the driver concerned to allow for unsupervised testing regimes.

The test module carries out fault injections based on the error definitions created for that device. The timing of the fault injections can be controlled to emulate real faults. This can be achieved by counting particular bus access requests, and then responding to the count value in accordance with a predefined schedule to determine when to inject the faults. Separate counters (COUNT 1) can be provided for respective access types, device components, etc. Faults can be injected into DMA (corrupting data for DMA to/from memory areas defined by device driver interface DMA calls), physical I/O (corrupting data sent/received via device driver interface get and put calls), and interrupts (generating spurious interrupts, losing interrupts, delaying interrupts).

By default, device driver interface access requests called from all drivers will be intercepted and faults potentially injected. However, a test field in the test configuration file of the test driver 96 can be set to a list of drivers to tested, or not, depending on the state of a test flag.

In addition to fault injection, the test mechanism can carry out a number of static checks which are controlled by properties in the test configuration file. These can include validation checks that: DMAs into main memory are only carried out into non-shared I/O MMU pages; there are no processor I/O accesses other than those using calls to device driver interface routines, such as ddi_get8( ), ddi_put8( ), etc., are not made specifying addresses outside the access address range; and calls to DMA synchronization routines are being made correctly.

Figure 6:
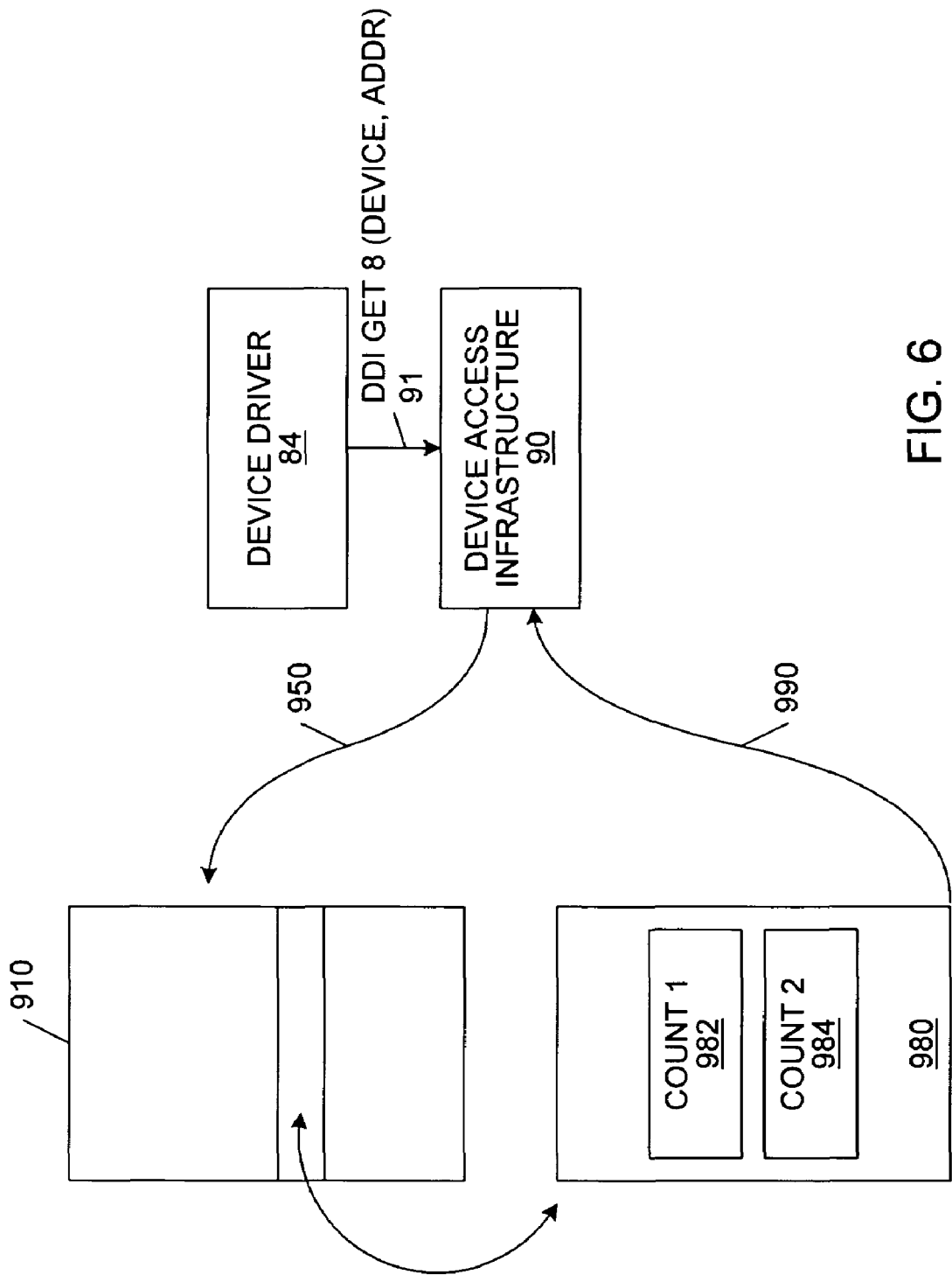
FIG. 6 is a schematic diagram illustrating the operation of the arrangement of FIG. 5.

FIG. 6 is a schematic representation of the operation of the test harness, or intercept mechanism 94, whereby a ddi (device driver interface) call such as ddi_get8( ) is intercepted at 950. The call is used in a test mode to access a test look-up table 910 provided by the test module 94. This table is referenced by the device access infrastructure 90 in response to a device access request. The test module thus enables device access calls to be intercepted. This test table 910 replaces the standard table used for accessing bus-specific device access routines for normal operation of the system. The table 910 identifies an appropriate intercept routine 980 for determining whether a fault is to be injected in response to the access call.

The decision whether to inject or not will depend on the determined intercept routine 98 which establishes a test pattern on the basis of potential faults which need to be tested, as configured by the test application 71 via the test interface 81 and the device driver 96. For each type of call, a counter (COUNT 1) can be provided, whereby a fault is injected every nth call, where n is a value between one and a large number depending on the test needs. A second counter (COUNT 2) can be provided where it is determined that the fault needs to be injected for a determined number of times successively to inject the fault. Alternatively, a full mapping algorithm could be provided determined injection instances in a sequence. Any appropriate encoding technique could be used, such as for example a multi-dimensional array with bits set for fault injections instances and bits not set where fault injection is not required. Alternatively, an encoding technique, for example run length encoding, could be employed to reduce the size of memory required for the test pattern mapping.

Where a fault is to be injected at 990, then this step is performed by the intercept routine 980. A response with a fault is emulated and returned from the access controller to the device driver. By monitoring, under the control of the test driver 96, and/or test application software for this purpose, it can then be determined whether the device driver 84 is hardened to deal with the fault which has been injected. By monitoring the result of passing the error to the device driver, at the simplest level to determine whether the computer system crashes, it can been seen if the device hardening fails to capture and recover from the fault. As described above the device access may alternatively proceed with the fault parameters injected by the intercept routine(s) 98.

Because this process is performed by the test mechanism, it is possible to provide a whole sequence of programmed tests without needing to reboot the system and/or modify the hardware in order to achieve the testing of the device hardening. This can enable testing of the device hardening much more rapid, reliable and complete that would have previously been possible.

Figure 7:
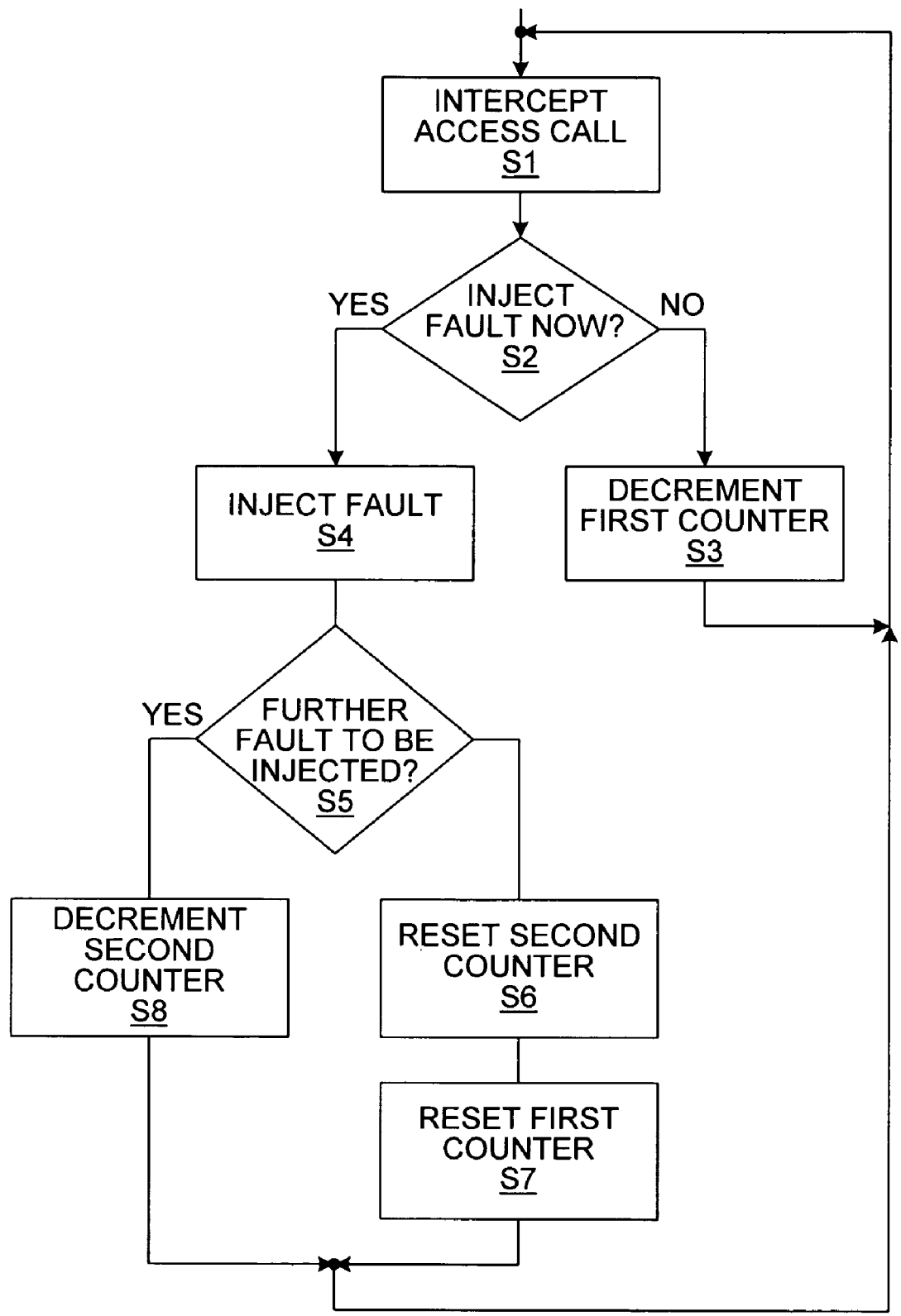
FIG. 7 is a flow diagram of the operation of the arrangement of FIG. 6.

FIG. 7 is flow diagram illustrating an overview of the process of intercepting device accesses and injecting errors.

In step S1, an access request to the access controller is intercepted.

In step S2, the injection routine determines whether an error is to be injected for this call. This can be determined, for example, by determining whether a first counter (982—see FIG. 6) for the type of injection routine concerned has underflowed. If it has not underflowed, then no fault is to be injected this time and control passes to step S3, where the count in the counter 982 is decremented. Control is then passed back to step S1.

If the first counter has underflowed, then at step S4 the fault data is injected by the intercept routines. The errors are returned to the originator of the device access request to emulate a real error.

In step S5 a check is made as to whether a further injection is required on the next call of the injection routine. This is determined by checking whether a second counter has underflowed.

If the second counter has underflowed, then no further injection is required. Accordingly, in step S6 the second counter 984 is reset to a value representative of the number of times the injection is to be repeated for successive calls of the intercept routine concerned. The first counter 982 is also reset in step S7 to the number of calls of the intercept routine concerned before the next error injection is to be performed. Control then passes back to step S1.

If the second counter has not underflowed, then the count in the second counter 984 is decremented in step S8 before control is passed back to step S1.

It will be appreciated that the flow diagram illustrated in FIG. 7, is merely one possible way of controlling the interception and injection process. Many changes could be envisaged. For example, the table 960 could form part of the device access infrastructure, rather than being referenced by the device access infrastructure in response to the access request. Also, rather than decrementing counters, incrementing counters could be used. Also, rather than simple counters, more complex mapping techniques for determining when and where to inject errors could be employed as mentioned above.

Figure 8:
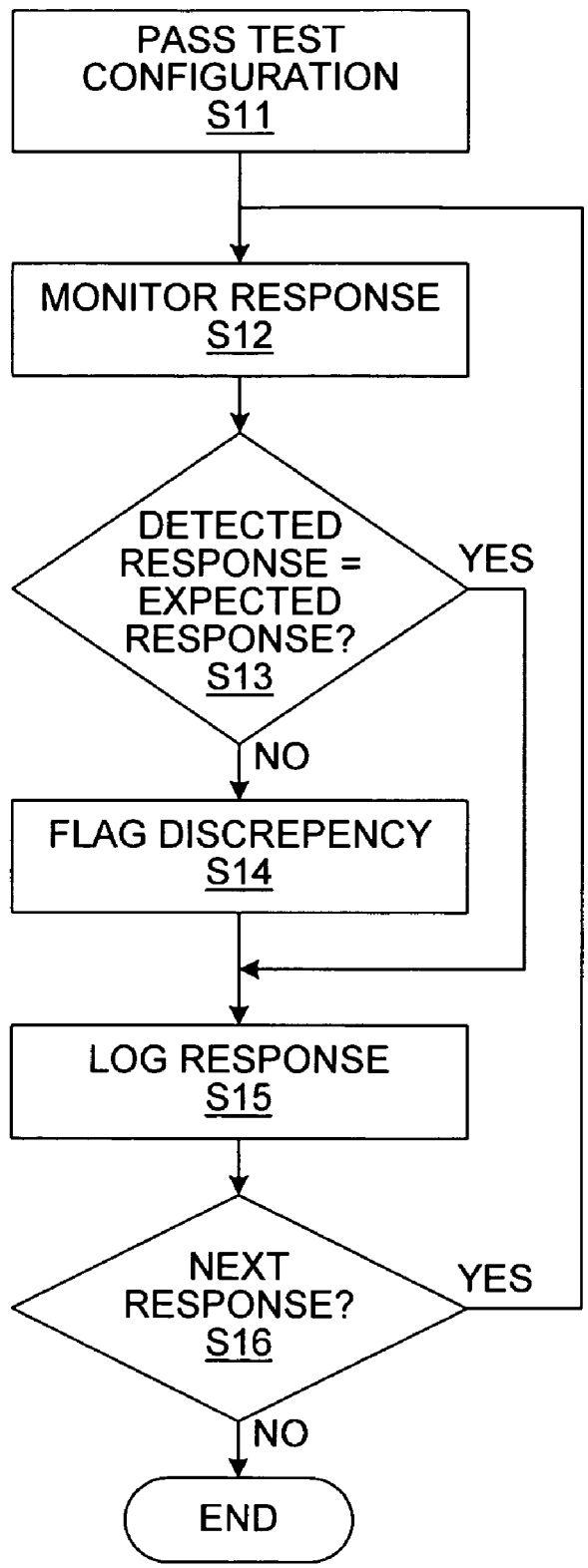
FIG. 8 is a flow diagram of the operation of a user application.

FIG. 8 is a flow diagram summarizing the testing utility functions which may be provided by a user application.

At step S11, the user application 99 passes a test configuration to the test driver 96, the test configuration identifying the device(s) to be tested and the parameters of the test.

At step S12, a testing utility in the user application monitors a response of a driver to the test conditions inserted by the test mechanism.

At step S13, the testing utility compares this to an expected result as defined in a test script.

At step S14, the testing utility flags any discrepancies. Optionally, the discrepancies could be displayed on a display connected to the graphics adapter of FIG. 1, or printed on a printout. Alternatively, they could simply be logged in step S15.

At step S15, the testing utility logs the responses with any discrepancies flagged and with the current test configuration.

At step S16 the testing utility returns for a next response.

The testing utility can be further operable in the event that a fault leads to the system locking to re-attach the driver to continue testing.

There now follows a summary of examples of possible I/O control operations (ioctls) which could be supported.

A first I/O control operation (HARNESS_ADD_DEF) provides a pointer to a structure for a test harness error definition. The structure is identified in Table 1 below:

TABLE 1

| struct harness-errdef { | |
|---|---|
| uint t namesize; | |
| char name; | /as returned by a method ddi_get_name( )/ |
| int instance; | /as returned by a method ddi_get_instance( )/ |
| int rnumber; | / a register number/ |
| offset_t offset; | /an address offset/ |
| offset_t len; | /a field length/ |
| uint_t access_type; | /an access type/ |
| uint_t access count; | /an access count/ |
| uint_t fail count; | /a repeat count/ |
| uint-t_acc-chk; | /an access check flag/ |
| uint_t operator; | /an operator/ |
| longlong_t operand; | /an operand/ |
| void error definition-handle; | /a pointer to an error definition/ |
| } | |

The error definition ("errdef") is passed to the driver (but is not actioned until a HARNESS-START I/O control operation is supplied). This returns an error definition handle, or pointer, when successful. A handle is a pointer to the appropriate function of entity which provide a compact definition of that function or entity. Multiple concurrent error definitions can be supported referring to the same or different devices. However if multiple faults end up being injected into the same access, the result may be undefined. The fault defined by the "operator" will be injected into the nth qualifying access where n is given by "access_count" and will then continue to be injected for a number of consecutive qualifying accesses defined by the "fail_count" variable. Although errors will cease to be injected once "fail_count" value has gone to zero, an access check will remain set until the error definition is cleared, or an appropriate I/O control operation is provide for the appropriate name and instance to clear this. Qualifying access are defined by "access_type", which can be one of the following types:

HARNESS-PIO-R—This is qualifying access in the form of a physical I/O read access where a device driver interface access handle is allocated using device information with a specified "name" and "instance", a specified "rnumber", with a requested address within a specified "offset" and "len". If the length "len" is 0, then the remainder of the register set qualifies. If "rnumber" is −1 then all register sets qualify. The "operator" can be one of:—

HARNESS_EQUAL—The data is read from the I/O card, but ignored and the contents of the "operand" are returned to the caller instead.

HARNESS_AND—The data is read from the I/O card and anded with the "operand" before being returned to the caller.

HARNESS_OR—The data is read from the I/O card and ored with the "operand" before being returned to the caller.

HARNESS_XOR—The data is read from the I/O card and xored with the "operand" before being returned to the caller.

HARNESS_NO_TRANSFER—No data is read from the I/O card and the "operand" is returned to the caller instead.

HARNESS-PIO-W—This a qualifying access in the form of a physical I/O write access where a device driver interface access handle is allocated using device information with a specified "name" and "instance", a specified "rnumber", with a requested address within a specified "offset" and "len". If the length "len" is 0, then the remainder of the register set qualifies. If "rnumber" is −1 then all register sets qualify. The "operator" can be one of:—

HARNESS_EQUAL—The contents of the "operand" are written to the I/O card instead of the requested data.

HARNESS_AND—The "operand" is anded with the requested data before being written to the I/O card.

HARNESS_OR—The "operand" is ored with the requested data before being written to the I/O card.

HARNESS_XOR—The "operand" is xored with the requested data before being written to the I/O card.

HARNESS_NO TRANSFER—No data is written to the I/O card.

HARNESS-DMA-R—This is a qualifying access in the form of an implicit or explicit device driver interface DMA synchronization access for the CPU or for the operating system kernel where a device driver interface DMA handle is allocated using device information with a specified "name" and "instance", where "rnumber" is −1 or corresponds to the sequential allocation number of the device driver interface DMA handle and where there are one or more longlong aligned longlongs within a specified offset and length range within the amount of space mapped by the device driver interface DMA handle. The corruption will apply to all such qualifying longlongs. A "longlong" is a double long word. The "operator" can be one of:—

HARNESS_EQUAL—The data is read from the I/O card into memory, but then the specified range of memory is overwritten by the contents of the "operand".

HARNESS_AND—The data is read from the I/O card into memory and then the specified range of memory is anded with the "operand".

HARNESS_OR—The data is read from the I/O card into memory and then the specified range of memory is ored with the "operand".

HARNESS_XOR—The data is read from the I/O card into memory and then the specified range of memory is ored with the "operand".

HARNESS_DMA_W—This is a qualifying access in the form of an implicit or explicit device driver interface DMA synchronization access for a device where the device driver interface DMA handle is allocated using device information with a specified "name" and "instance" and "register number" is −1 or corresponds to the sequential allocation number of the device driver interface DMA and where there are one or more longlong aligned longlongs within a specified offset and length range within the amount of space mapped by the device driver interface DMA handle. The corruption will apply to all such qualifying longlongs. The "operator" can be one of:—

HARNESS_EQUAL—A copy of the data is taken, and the specified range of memory is then overwritten by the contents of the "operand". The DMA is then pointed at the copy of the data rather than the original.

HARNESS_AND—A copy of the data is taken, and the specified range of memory is then anded with the contents of the "operand". The DMA is then pointed at the copy of the data rather than the original.

HARNESS_OR—A copy of the data is taken, and the specified range of memory is then ored with the contents of the "operand". The DMA is then pointed at the copy of the data rather than the original.

HARNESS_XOR—A copy of the data is taken, and the specified range of memory is then xored with the contents of the "operand". The DMA is then pointed at the copy of the data rather than the original.

HARNESS_INTR—This is a qualifying access in the form of an interrupt service routine called where an interrupt specification is allocated using device information with a specified "name" and "instance". Arguments relating to "rnumber", "offset" and "len" are ignored in this case. The "operator" can be one of:

HARNESS_DELAY_INTR—This will cause an interrupt to be held off for a number of microseconds specified by an operand (except for "hilevel" interrupts).

HARNESS_LOSE_INTR—This will cause an interrupt to be lost permanently. An operand is ignored in this case.

HARNESS_EXTRA_INTR—This will cause a number of additional spurious interrupts indicated by an operand to be generated.

A second I/O control operation deletes a definition (HARNESS_DEL_DEF). This provides a pointer to the item shown in Table 2.

TABLE 2

| void *errdef_handle; |
| --- |

The errdef_handle field should be the value filled in the errdef_handle field of the error definition structure as returned from a HARNESS_ADD_DEF I/O control operation. This will cancel the specified error definition.

A third I/O control operation (HARNESS_START) has as an argument a pointer to the item shown in Table 3.

TABLE 3

```
struct harness-errctl {
    uint_t namesize;
    char name;      /as returned by a method ddi__get__name( )/
    int instance;   /as returned by a method ddi__get__instance( )/
}
```

This will set running all error definitions (errdefs) with the specified "name" and "instance". The errdefs are not automatically set running by the HARNESS-ADD-DEF I/O control operations so that the HARNESS_START I/O control operation always needs to be called.

A fourth I/O control operation (HARNESS_STOP) has as an argument a pointer to the structure shown in Table 3. This will suspend all error definitions (errdefs) with the specified "name" and "instance". The errdefs can be restarted again by a subsequent HARNESS_START I/O control operation.

A fifth I/O control operation (HARNESS_BROADCAST) has as an argument a pointer to the structure shown in Table 3. Any processes up that are dormant, or sleeping, in a HARNESS_CHK_STATE_W I/O control operation for an error definition with the specified "name" and "instance" will be woken up.

A sixth I/O control operation (HARNESS CLEAR_ACC_CHK) has as an argument a pointer to item shown in Table 3. For all error definitions with the specified "name"/"instance", if "access_count" and "fail-count" are already zero, then this will set the "acc-chk" field to zero. Any processes up that are sleeping in a HARNESS_CHK STATE_W I/O control operation for an error definitions with this "name" and "instance" will be woken up.

A seventh I/O control operation (HARNESS_CLEAR_ERRORS) has as an argument a pointer to item shown in Table 3. For all error definitions with the specified "name" and "instance", if "access_count" is already zero, then this will set the "acc-chk" and "fail-count" fields to zero. Any processes up that are sleeping in a HARNESS_CHK_STATE_W I/O control operations for an error definition with this "name"/"instance" will be woken up.

An eighth I/O control operation (HARNESS_CLEAR_ERRDEFS) has as an argument a pointer to item shown in Table 3. For all error definitions with the specified "name" and "instance", this will set the "acc_chk", "fail-count" and "access-count" fields to zero. Any processes that are sleeping in a HARNESS_CHK_STATE_W I/O control operation for an error definition with this "name" and "instance" will be woken up.

A ninth I/O control operation (HARNESS_CHK_STATE) has as an argument a pointer to the item shown in Table 4.

TABLE 4

```
struct harness-errstate {
    ulong_t fail time;      /time that access count went to zero/
    ulong_t msg_time;       /time that u4ft-ddi_report_error was called/
    uint_t access count;
    uint_t fail count;
    uint_t acc chk;
    uint_t errmsg_count;
    char buffer[ERRMSGSIZE];
```

TABLE 4-continued

```
    ddi__severity_t severity;
    void errdef-handle;
};
```

The errdef handle field should be the value filled in the errdef handle field of the errdef structure shown in Table 1, as returned from a HARNESS_ADD_DEF ioctl. On return from the HARNESS_CHK STATE I/O control operations, the other fields will be filled in.

The "msg-time", "buffer" and "severity" will be for the first occurrence of the highest "severity" error message reported since "access-count" went to zero for this error definition.

A tenth I/O control operation (HARNESS_CHK_STATE_W) has as an argument a pointer to the item shown in Table 4. If the "access count" has gone to zero for this error definition and a u4 ft-ddi-report-erroro( ) has occurred since the last time HARNESS-CHK-STATE-W was called then the I/O control operations will return immediately. Otherwise the I/O control operation will sleep until the "access count" for this error definition handle has gone to zero and the next subsequent u4 ft-ddi-report-erroro( ) occurs (or until one of HARNESS_BROADCAST, HARNESS_CLEAR_ACC_CHK, HARNESS_CLEAR_ERRORS or HARNESS_CLEAR_ERRDEFS I/O control operations is called for the same "name" and "instance").

An eleventh I/O control operation (HARNESS_DEBUG_ON) has as an argument a pointer to item shown in Table 2. This will turn on debug information for the specified error definition (such that the driver will output information).

A twelfth I/O control operation (HARNESS_DEBUG_OFF) also has a has as an argument a pointer to the item shown in FIG. 2. This will turn off debug information for the specified error definition.

A thirteenth I/O control operation (HARNESS-GET-HANDLES) has as an argument a pointer to the item shown in Table 5.

TABLE 5

```
struct harness__get__handles {
    uint_t namesize;
    char name;      /as returned by a method ddi__get__name( )/
    int instance;   /as returned by a method ddi__get__instance( )/
    int count;
    char buffer;
};
```

This will copy a string of up to "count" bytes of ascii information listing the various ddi, access and interrupt handles for device(s) with the specified "name" and "instance" into a character buffer identified by "buffer".

There now follows a description of a process, or mechanism, (th_define) for providing an error definition for the driver test harness. th_define(1) allows an error definition ("errdef") to be specified.

The errdef is passed to the test driver, but is not actioned until th_manage(1) is called to start testing. th_define(1) sleep until either a u4 ft_ddi_report_error(9) occurs for the device in question or until th_manage(1) wakes it up. th_define(1) will then output the parameters it was called with and the current state of the error definition to a standard output. If "access count" or "fail count" or "acc-chk" are still non-zero, then th_define(1) will go back to sleep again. When th_define(1) is finally woken up with "access_count", "fail_count" and "acc_chk" all zero, it will then exit, causing the error definition def to be canceled.

If the optional debug parameter is an non-zero number, the debug will be turned on for this error definition, causing information to be displayed by the test driver.

Multiple concurrent error definitions can be supported referring to the same or different devices. However if multiple faults end up being injected into the same access, the result may be undefined.

The fault defined by "operator" will be injected into the nth qualifying access where n is given by "access count" and will then continue to be injected for "fail-count" consecutive qualifying accesses. The value in "acc_chk" can be NULL, U4FT_ACC_NO_PIO, U4FT_ACC_NO_DMA or U4FT_ACC_NO_IRQ, and will be ored into the value to be returned from u4 ft_ddi_check_access( ) subsequent to the first fault being injected. Although errors will cease to be injected once "fail count" has gone to zero, "acc_chk" will remain set (until th_define(1) exits, or th_manage(1) is called to clear errors, etc. for this device).

Qualifying access are defined by "access_type", which can be one of:—

PIO-R—This is qualifying access in the form of a physical I/O read access where a device driver interface access handle is allocated using device information with a specified "name" and "instance", a specified "rnumber", with a requested address within a specified "offset" and "len". If the length "len" is 0, then the remainder of the register set qualifies. If "rnumber" is −1 then all register sets qualify. The "operator" can be one of:—

EQ—The data is read from the I/O card, but ignored and the contents of the "operand" are returned to the caller instead.

AND—The data is read from the I/O card and anded with the "operand" before being returned to the caller.

OR—The data is read from the I/O card and ored with the "operand" before being returned to the caller.

XOR—The data is read from the I/O card and xored with the "operand" before being returned to the caller.

NO—No data is read from the I/O card and the "operand" is returned to the caller instead.

PIO-W—This a qualifying access in the form of a physical I/O write access where a device driver interface access handle is allocated using device information with a specified "name" and "instance", a specified "rnumber", with a requested address within a specified "offset" and "len". If the length "len" is 0, then the remainder of the register set qualifies. If "rnumber" is −1 then all register sets qualify. The "operator" can be one of:—

EQ—The contents of the "operand" are written to the I/O card instead of the requested data.

AND—The "operand" is anded with the requested data before being written to the I/O card.

OR—The "operand" is ored with the requested data before being written to the I/O card.

XOR—The "operand" is xored with the requested data before being written to the I/O card.

NO—No data is written to the I/O card.

DMA-R—This is a qualifying access in the form of an implicit or explicit device driver interface DMA synchronization access for the CPU or for the operating system kernel where a device driver interface DMA handle is allocated using device information with a specified "name" and "instance", where "rnumber" is −1 or corresponds to the sequential allocation number of the device driver interface DMA handle and where there are one or more longlong aligned longlongs within a specified offset and length range within the amount of space mapped by the device driver interface DMA handle. The corruption will apply to all such qualifying longlongs. The "operator" can be one of:—

EQ—The data is read from the I/O card into memory, but then the specified range of memory is overwritten by the contents of the "operand".

AND—The data is read from the I/O card into memory and then the specified range of memory is anded with the "operand".

OR—The data is read from the I/O card into memory and then the specified range of memory is ored with the "operand".

XOR—The data is read from the I/O card into memory and then the specified range of memory is ored with the "operand".

DMA_W—This is a qualifying access in the form of an implicit or explicit device driver interface DMA synchronization access for a device where the device driver interface DMA handle is allocated using device information with a specified "name" and "instance" and "register number" is −1 or corresponds to the sequential allocation number of the device driver interface DMA and where there are one or more longlong aligned longlongs within a specified offset and length range within the amount of space mapped by the device driver interface DMA handle. The corruption will apply to all such qualifying longlongs. The "operator" can be one of:—

EQ—A copy of the data is taken, and the specified range of memory is then overwritten by the contents of the "operand". The DMA is then pointed at the copy of the data rather than the original.

AND—A copy of the data is taken, and the specified range of memory is then anded with the contents of the "operand". The DMA is then pointed at the copy of the data rather than the original.

OR—A copy of the data is taken, and the specified range of memory is then ored with the contents of the "operand". The DMA is then pointed at the copy of the data rather than the original.

XOR—A copy of the data is taken, and the specified range of memory is then xored with the contents of the "operand". The DMA is then pointed at the copy of the data rather than the original.

INTR—This is a qualifying access in the form of an interrupt service routine called where an interrupt specification is allocated using device information with a specified "name" and "instance". Arguments relating to "rnumber", "offset" and "len" are ignored in this case. The "operator" can be one of:

DELAY—This will cause an interrupt to be held off for a number of microseconds specified by an operand (except for "hilevel" interrupts).

LOSE—This will cause an interrupt to be lost permanently. An operand is ignored in this case.

EXTRA—This will cause a number of additional spurious interrupts indicated by an operand to be generated.

There now follows a description of a process, or mechanism, (th_manage) for managing the test mechanism for a specified device. th_manage(1) acts on the all error definitions ("errdefs") for a specified "name" and "instance". It supports the following "command" values:—

START—This sets running or resumes all errdefs for the specified "name" and "instance".

STOP—this suspends all errdefs for this "name" and "instance".

BROADCAST—This wakes up all th_define(1) processes for this "name" and "instance", causing them to display their current status and exit if the errdef is now defunct (i.e. "access-count", "fail-count" and "acc-chk" are all zero).

CLEAR_ACC_CHK—This wakes up all th-define(1) processes for this then set "name" and "instance". If "access_count" and "fail_count" are already zero, then "acc_chk" is set to zero too, so that th_define(1) will exit once it has displayed its status.

CLEAR_ERRORS—This wakes up all th_define(1) processes for this "name" and "instance". If "access_count" is already zero, then "fail-count" and "acc_chk" are set to zero too, so that th_define(1) will exit once it has displayed its status.

CLEAR_ERRDEFS—This wakes up all th_define(1) processes for this "name" and "instance". "access_count", "fail_count" and "acc_chk" are all set to zero, so that all th_define(1) commands will exit once they have displayed their status.

GET-HANDLES—This will display all the handles currently being intercepted by the test mechanism for this "name" and "instance".

There now follow examples of test hardness usage.

Consider error definitions for an instance 0 of the "foo" device, type

| | |
|---|---|
| th-define | foo 0 . . . & |
| th-define | foo 0 . . . & |
| th-define | foo 0 . . . & |
| th-define | foo 0 . . . & |

Start the test by entering:

th_manage foo 0 START

The status of the error definitions can be checked by entering:

th_manage foo 0 BROADCAST

This will cause each th_define process to print out its current status. If the driver has reported a fatal error the driver can be detached to clear the error by entering:

th_manage foo 0 CLEAR_ACC_CHK or th_manage foo 0 CLEAR_ERRORS and reattaching the driver.

Testing may be terminated by entering:

th_manage foo 0 CLEAR_ERRDEFS

Examples of error definitions are set out below:

-th-define foo 3 1 0 0 PIO_R 0 1 U4FT_ACC_NO_PIO OR 0X100

This will cause 0x100 to be ored into the next physical I/O read access from any register in register set 1 of instance 3 of the foo driver. Subsequent calls in the driver to u4Fft_ddi_check_accessO will have the U4FT_ACC_NO_PIO bit set.

-th_define foo 3 1 0x8100 1 PIO_W 100 3-AND 0xffff-efff

This will cause the next 100 physical I/O writes to the register at offset 0x8100 in register set 1 of instance 3 of the foo driver to take place as normal. However, on each of the three subsequent accesses, the 0x1000 bit will be unset.

-th_define foo 3-1 256 256 DMA_W 0 1 U4FT_ACC_NO_DMA OR 7-

This will cause 0x7 to be ored into each longlong in the range from offset 256 to offset 512 of the next DMA write using any DMA handle for instance 3 of the foo driver. Subsequent calls in the driver to u4 ft_ddi_check_accessO will have the U4FT-ACC—NO-DMA bit set.

-th-define foo 3 – – – INTR 0 6-LOSE-

This will cause the next six interrupts for instance 3 of the foo driver to be lost.

-th-define foo 3 – – – INTR 30 1 U4FT_ACC_NO_IRQ EXTRA 10

This will mean that when the 30th subsequent interrupt for instance 3 of the foo driver occurs, an additional 10 further interrupts will also be generated. Subsequent calls in the driver to u4 ft_ddi_check_accesso will have the U4FT_ACC_NO_IRQ bit set.

-th_define foo 3 – – – INTR 0 1-DELAY 1024

This will cause the next interrupt for instance 3 of the foo driver to be delayed by 1024 microseconds.

It will be appreciated that this are merely examples of error definitions, and that a vast variety error definitions may be created with an embodiment of the invention, without the need to physically cause the errors in hardware.

In one embodiment of the invention, the test mechanism is implemented as computer control code, or software, which is stored in the memory 14 of the computer system of FIG. 1 and is executed on the processor 12 of FIG. 1. It will, however, be appreciated that the test mechanism could be provided on other carrier media, such as a disk, tape, or as electrical, optical, wireless or other signals on a telecommunications medium. The test mechanism could also be implemented, at least on part, by means of special purpose hardware, for example by being implemented in an ASIC.

The user application can also be implemented as computer control code, or software, which is stored in the memory 14 of the computer system of FIG. 1 and is executed on the processor 12 of FIG. 1. It will, however, be appreciated that the test mechanism could be provided on other carrier media, such as a disk, tape, or as electrical, optical, wireless or other signals on a telecommunications medium. The user application could also be implemented, at least on part, by means of special purpose hardware, for example by being implemented in an ASIC.

It will further be appreciated that although particular embodiments of the invention have been described, many modifications/additions and/or substitutions may be made within the spirit and scope of the present invention as defined in the appended claims.

What is claimed is:

1. A test mechanism for testing device driver hardening, the test mechanism comprising an intercept mechanism for intercepting device access calls from a device driver under test and an interface for configuring the intercept mechanism for faults to be injected in response to the device access calls according to a determined test pattern.

2. The test mechanism of claim 1, wherein the intercept mechanism comprises a plurality of intercept routines.

3. The test mechanism of claim 2, wherein each intercept routine is for a given type of device access call.

4. The test mechanism of claim 3, wherein each type of device access call is separately monitored.

5. The test mechanism of claim 2, comprising a mapping mechanism for mapping device access calls to intercept routines.

6. The test mechanism of claim 5, wherein the mapping mechanism comprises a look-up table.

7. The test mechanism of claim 1, wherein the intercept mechanism is operable to monitor device access calls to determine when to inject a fault.

8. The test mechanism of claim 7, wherein the interface is operable to configure the intercept mechanism for determining when the intercept mechanism injects a fault.

9. The test mechanism of claim 1, comprising a counter associated with at least one predetermined type of device access call, the intercept mechanism being configured to monitor the counter which is modified for each device access call of that type, and to be operable to inject a fault in response to a determined count of the counter.

10. The test mechanism of claim 9, comprising a second counter for determining a number of times a fault is to be injected for successive device access calls of the predetermined type.

11. The test mechanism of claim 1, wherein a device access infrastructure is responsive to a device access call to intercept the call for the selective insertion of faults and the intercept mechanism is operative to return an emulated device response.

12. The test mechanism of claim 1, wherein a device access infrastructure is responsive to a device access call to intercept the call and the intercept mechanism is operable to provide selective insertion of faults prior to effecting the device access.

13. The test mechanism of claim 12, wherein the intercept mechanism operates on data of a device access call with a determined operator and operand.

14. The test mechanism of claim 1, wherein the interface comprises an application program interface responsive to a test application for determining a test pattern.

15. A test application on a carrier medium for a test mechanism according to claim 14, the test application comprising computer code configured to be operable:
   to provide the interface with a test configuration;
   to detect the response of a device driver to a test condition inserted by the intercept mechanism;
   to compare the detected response to an expected response set out in a test script; and
   to identify discrepancies between the detected response and the expected response.

16. The test application of claim 15, wherein the test application comprises computer code configured to be operable to maintain a log of the detected responses.

17. A computer program product on a carrier medium, the computer program product comprising an intercept mechanism for intercepting device access calls from a device driver under test and an interface for configuring the intercept mechanism for faults to be injected in response to the device access calls according to a determined desired test pattern.

18. A test mechanism for testing device driver hardening, the test mechanism comprising a means for intercepting device driver access calls from a device driver under test and means for injecting a fault in a response to the device access call according to a determined test pattern.

19. A computer comprising a device driver for accessing an I/O device and a test mechanism for testing device driver hardening, the test mechanism comprising an intercept mechanism for intercepting device access calls from a device driver under test and an interface for configuring the intercept mechanism for faults to be injected in response to the device access calls according to a determined test pattern.

20. A method of testing the hardening of a device driver, the method comprising intercepting device driver access calls from the device driver and injecting a fault in a device driver access according to a desired test pattern.

21. The method of claim 20, comprising a mapping the device access call to at least one intercept routine for handling the device access call.

22. The method of claim 21, comprising mapping a device access call to an intercept routine according to a device access call type.

23. The method of claim 20, comprising monitoring device access call to determine when to inject a fault.

24. The method of claim 23, comprising modifying a count for each device access call of a given type and injecting a fault in response to predetermined count being attained.

25. The method of claim 24, comprising separately monitoring each type of call.

26. The method of claim 24, comprising a further step of monitoring a number of times the fault is to be injected in sequence.

* * * * *